United States Patent [19]

Straub et al.

[11] Patent Number: 5,764,130
[45] Date of Patent: Jun. 9, 1998

[54] INSERT MOLDED OPEN AIR THERMAL PROBE WITH A PROTECTIVE BASKET

[75] Inventors: Peter John Straub, Warren; Richard Darrell Kirkwood, Bristolville, both of Ohio

[73] Assignee: General Motors Corporation, Detroit, Mich.

[21] Appl. No.: 577,608

[22] Filed: Dec. 22, 1995

[51] Int. Cl.⁶ ...................................................... H01C 3/04
[52] U.S. Cl. .......................... 338/28; 338/25; 338/22 R; 338/277
[58] Field of Search ........................... 338/22 R, 225 D, 338/25, 28, 53, 57, 277

[56] References Cited

U.S. PATENT DOCUMENTS

| | | | |
|---|---|---|---|
| 3,918,018 | 11/1975 | Tuley et al. | 338/28 |
| 4,142,170 | 2/1979 | Blatter | 338/28 |
| 4,143,348 | 3/1979 | Hoge | 338/28 |
| 4,284,877 | 8/1981 | Abura et al. | 219/222 |
| 4,420,738 | 12/1983 | Rehmann et al. | 338/28 |
| 5,046,857 | 9/1991 | Metzger et al. | 374/135 |
| 5,342,126 | 8/1994 | Heston et al. | 374/208 |
| 5,462,359 | 10/1995 | Reichi et al. | 374/148 |

FOREIGN PATENT DOCUMENTS

| | | |
|---|---|---|
| 3044419 A | 6/1982 | Germany . |
| 2207509 | 2/1989 | United Kingdom . |

OTHER PUBLICATIONS

Nagai et al., SiC Thin–Film Thermistor for Household Products, National Tech. Report, V. 26, No. 3, Jun. 1980.
English translation of Nagai et al., listed as Document No. R in Paper No. 2, Form 892.
European Search Report and Annex re Appln No. EP 96 20 3312 dated 13, Mar. 1997.

*Primary Examiner*—Teresa J. Walberg
*Assistant Examiner*—Karl Easthom
*Attorney, Agent, or Firm*—Cary W. Brooks

[57] ABSTRACT

A temperature sensing element packaged in a protected basket by a single insert molding operation. This design does not obstruct the air flow perpendicular to the thermistor thickness, and thus provides enhanced response time.

3 Claims, 3 Drawing Sheets

5,764,130

INSERT MOLDED OPEN AIR THERMAL PROBE WITH A PROTECTIVE BASKET

FIELD OF THE INVENTION

This invention relates to methods of molding or packaging sensing elements.

BACKGROUND OF THE INVENTION

With the increased use of computer controlled systems in the automotive industry sensors on vehicles have become more common. As such, there is an increased need for packaging electronic devices into sensors that can withstand the environment of the vehicle. These sensors must be robust to protect the element during vehicle assembly and also during vehicle operation. In addition, there is continued pressure to develop sensors that are simple and low-cost.

Currently, the primary element used in automotive temperature sensors, throughout the world, is the thermistor. The thermistor is relatively robust, low-cost device, that if packaged correctly, can be used in automotive applications ranging from coolant temperature sensors, to transmission temperature sensors, to intake air temperature sensors, to inside the cabin air temperature sensors for the heating, ventilating and air conditioning (HVAC) system. In most cases, the thermistor is not the limiting factor in the performance of the sensor, but rather it is the way the thermistor was packaged within the sensor that limits its performance, especially with respect to time response. In addition to time response, the method of packaging the thermistor also greatly impacts the price of the temperature sensor. As additional sensors are required, the desire to reduce the sensor's cost will be emphasized. Further, the growth of the temperature sensor market has increased the competition which has forced the need to design new lower cost sensors.

The increased desire for automatic HVAC control has caused a subsequent increase in the need for temperature monitoring of the air exiting the HVAC ducts into the passenger compartment. If the temperature of the discharge air is known, the automatic HVAC control unit can maintain a stable cabin temperature more easily than with today's HVAC system technology. In order to monitor the temperature of this "discharge air", a temperature sensor with a fast time response is required in the duct in a location before the air exits the duct. Since most vehicles will use several of these sensors, a low cost sensor will be required in order to make this technology of discharge air measurement economical.

There are a number of designs to package a thermistor into a temperature sensor. In most automotive sensor designs, the sensor must provide an electrical path from the thermistor to male terminals that mate to a wiring harness. One method of providing an electrical path from thermistor to the male terminals is attaching the thermistor to wires, via (1) soldering, and (2) attaching the opposite end of the wire to male terminals by welding, crimp and welding, or soldering to the male terminals. Another method which is less common, is to solder the thermistor directly to the male terminals. In either way, an electrical connection is provided from the thermistor to the mating connector. This subassembly is then packaged into a protective housing.

Commonly used methods of packaging the thermistor and terminal subassembly involve injection and insert molding of plastic bodies and subsequent assembly operations (press-fit, glue, sonic welding) of these multiple pieces. Although metal housings are sometimes used in engine intake air sensor applications, the trend has been toward all plastic packages for air sensor applications. The use of plastics typically allows greater design freedom of mounting features (i.e., twist-lock, snap-fit) which simplifies final vehicle assembly.

Press-fit designs uses both insert and injection molding in manufacturing the sensor subcomponents. The subcomponents are assembled together by a press-fit—pressing the insert molded subassembly into the shell with an interference fit.

There are three methods of insert molding the entire sensor body. In the first design, the thermistor is overmolded by an insert molding operation within a metal shell. In the second design, a thermistor is overmolded by an insert molding operation without an additional metal housing. Both designs mold over the thermistor which could damage the thermistor solder joint, and also slows the response of the thermistor to a change in temperature. A third method overmolds on a previously overmolded thermistor subassembly.

In order to meet the requirements for faster responding sensors to a temperature change, many air temperature sensor have a configuration that allows the air to contact the thermistor directly. The configuration is usually designed to maximize the amount of air flow to the thermistor while, at the same time, protecting the thermistor from damage (usually during vehicle assembly). The designs described below all require at least one assembly step in addition to an injection molding, insert molding, and/or machining operations.

In addition, other sensor designs have used mounting features (i.e., twist lock) to ensure that the thermistor thickness is perpendicular to the direction of the air flow. In most cases, this orientation provides the fastest responding temperature sensor. Also, ensuring the same thermistor orientation to the air flow, optimizes the consistency of the response time from vehicle to vehicle. In an attempt to meet this requirement, of the thermistor thickness being perpendicular to the air flow, and in addition providing an unblocked air flow, the following are previous designs.

One design for HVAC air sensors that has completely eliminated the protective cage or basket uses an industry standard thermistor "radial" lead package. This is one of the most economical and most common thermistor lead arrangement. The thermistor leads are crimped to the larger wire and then overmolded. Using this thermistor package and a one step insert molding process, the requirements, that the thermistor be protected and that the thickness of the thermistor be exposed to the air flow, cannot be achieved with this technology. In most applications, the thickness of the thermistor element must face perpendicular to the direction of air flow. The design does not use a protective basket because:

1. It is not possible to shut-off on the lead wires to mold a basket and allow the thickness of the thermistor to be perpendicular to the air flow; and 2. An arch would only satisfy the requirement that the sensor be protected. It would contradict the requirement that the thickness of the thermistor be exposed to the air flow, since an arch could only be molded in a way that would expose the broader face of the thermistor to the air flow.

One method that satisfies the thickness/air flow requirement, while protecting the thermistor, is a method of using a molded arch with a nonstandard terminal thermistor subassembly. In this design, the thermistor orientation is rotated 90° to the male terminals. This enables the sensor to be packaged in one insert molding operation because the terminals on the thermistor side are in the correct orientation for the insert mold to shut-off. In this thermistor package, the thermistor is soldered directly to the male terminals. The manufacturing of this type of subassembly requires substantial capital investment. In this design, only an arch can be molded. A basket or other protective cage cannot be molded in a multiple cavitation insert mold without extreme complexity with existing technology.

Another design that satisfies the thickness/air flow requirement, while protecting the thermistor, is a two-piece design using an insert molded premold and an injection molded shell. The two parts are then assembled by pressing the insert into the shell. The insert is retained into the shell by the metal press-fit wings that protrude beyond the premold. Because the shell is injected molded in a separate tool, the arch can be molded to allow the sides of the thermistor thickness to be open. Therefore, this design allows air to contact the thermistor thickness and also protect the thermistor from damage. This design uses a smaller premold and terminal thermistor subassembly. This subassembly is the same crimpless lead frame design used in many other applications. Since the premold is not sealed to the shell internally, a leak path exists between the premold and the shell. This leak path may not meet leak requirements for some applications. In addition, this leak path has the potential to whistle or hiss as air exits or enters the duct through the inside of the sensor.

The present invention provides advantages over the prior art.

SUMMARY OF THE INVENTION

The new design is the packaging of a temperature sensing element in a protected basket by a single insert molding operation. This design does not obstruct the air flow perpendicular to the thermistor thickness. Thus, the design provides for enhanced response time. The manufacturing of this sensor includes a single insert molding operation using a standard thermistor orientation and a standard crimpless terminal thermistor subassembly.

These and other objects, features and advantages of the present invention will become apparent from the following brief description of the drawings, detailed description, appended claims and accompanying drawings.

DETAILED DESCRIPTION

Figure 1:
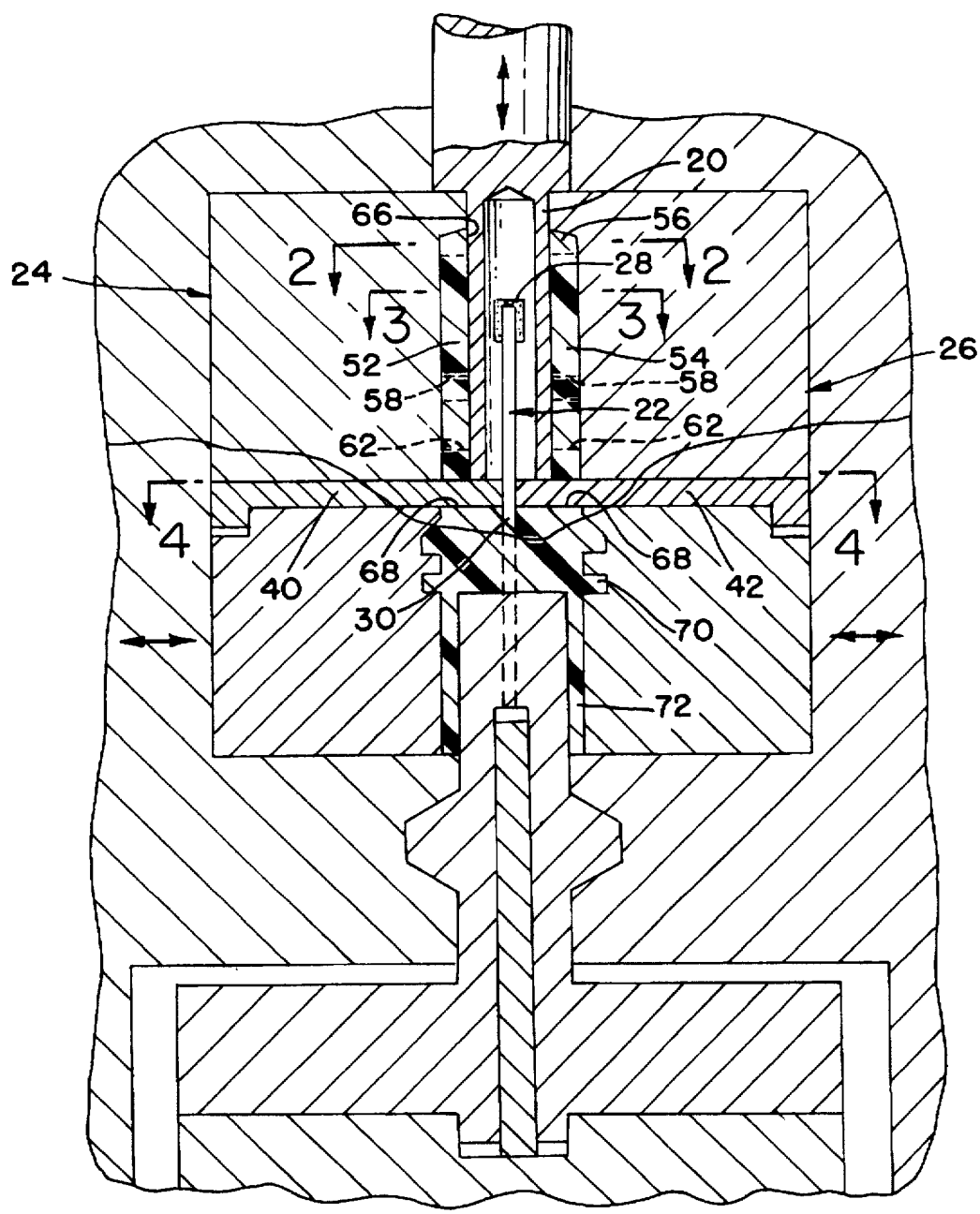
FIG. 1 illustrates a molding apparatus and method of the present invention including a hollow sleeve used to form the open basket of the sensor overmold.
Figure 2:
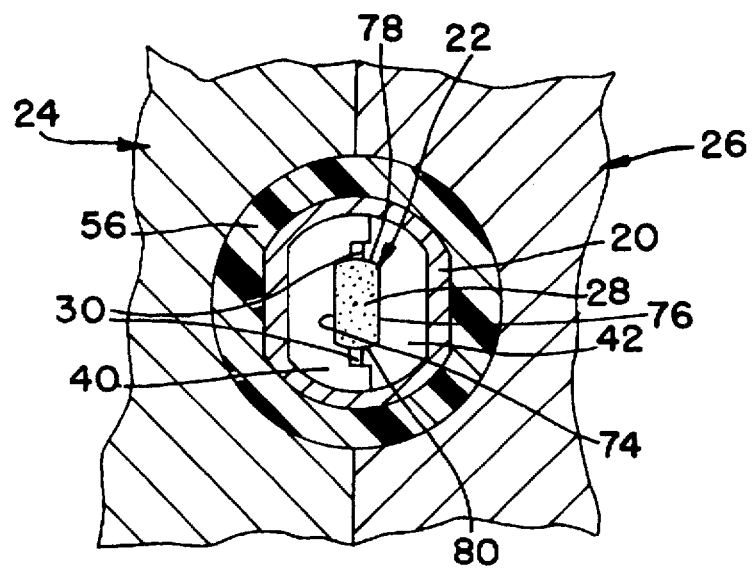
FIG. 2 is a sectional view taken along line 2—2 of FIG. 1.
Figure 3:
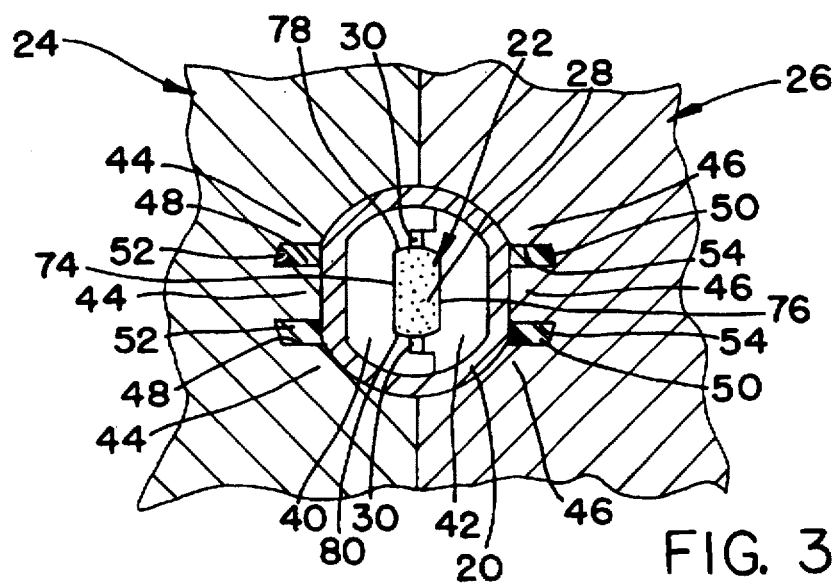
FIG. 3 is a sectional view taken along line 3—3 of FIG. 1.
Figure 4:
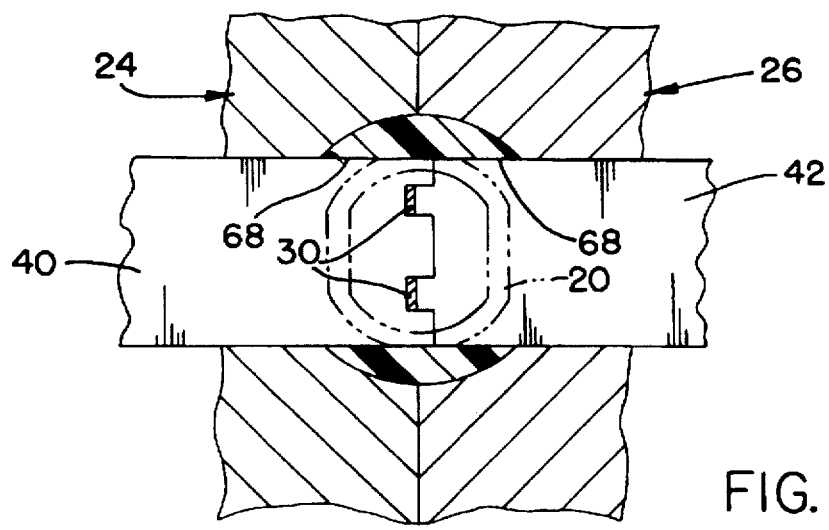
FIG. 4 is a sectional view taken along line 4—4 of FIG. 1.
Figure 5:
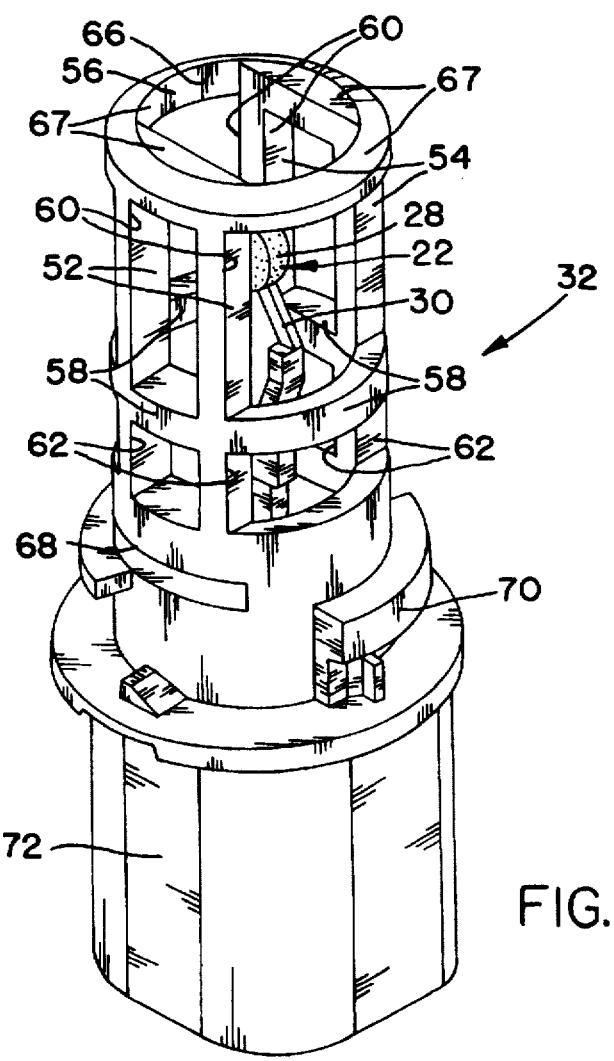
FIG. 5 illustrates a thermal sensor according to the present invention having a thermistor and terminals with a molded-over protective basket according to the present invention.

In order to mold the protect basket and connector body in a single insert molding operation, the tool conventionally shuts-off on the thermistor side of the terminals through windows in the plastic body. The term "shut-off" as used herein means the location where the molding dies closes off around the insert piece being overmolded. Referring to FIGS. 1–2 and 4, a hollow sleeve 20 lowers to surround the terminal and thermistor assembly 22. Two mold dies 24, 26 move horizontally towards each other and shut-off on the hollow sleeve 20. Each die halve 24, 26 includes a plate 40, 42 which shut-off on the terminals 30. Referring to FIG. 3, each die halve 24, 26 also includes inwardly extending projections 44, 46 which shut-off on the sleeve 20 and define associated recesses 48, 50. Referring to FIGS. 3 and 5, the recesses 48, 50 are filled with plastic and define the side legs 52, 54, top 56 and bottom 58 legs of first side windows 60 of the basket. Side windows 60 may be positioned at least ninety degree angles, in a radial direction, from each other. A second set of side windows 62 may be defined under the first set of windows 60 in a similar manner.

The sleeve 20 produces a top window 66 defined by window frame legs 67 formed at a ninety degree angle to the side window frame legs 52, 54 of the first set of windows 60. The plates 40, 42 also produces a fourth set of windows 68. The plastic overmold includes threads or locking features 70 for securing the thermal probe assembly to another member, and a skirt 72 extending downwardly from the basket to protect the terminals 30. The hollow sleeve forms the inside of the basket. The sleeve also protects the terminal and thermistor from becoming overmolded with plastic as the plastic flows around the terminal shut-off plates and fills-out the basket. The plastic overmold is a single piece and is not two pieces coupled together.

Although this design requires an additional tooling action (the raising and lowering of the sleeve 20), this action is already present on many vertical insert molding machines, which open and close in the vertical direction, therefor the tool design to perform this extra action is rather simple.

This design also provides a protective basket with openings on more than two sides of the thermistor rather than an arch. In applications where the sensor orientation is not the same in every vehicle, this basket design makes the time response less dependent upon the orientation of the sensor in the application because the basket provides air flow across both opposite faces 74, 74 and both sides 78, 80 (FIGS. 2–3) of the thermistor whereas an arch would completely block the air on two sides. In addition, the basket protects the thermistor element and terminals from damage during shipping, vehicle assembly, and in the vehicle application. The protective basket provides the potential to ship the sensor on the wiring harness without sensor damage. In addition, this concept of a hollow sleeve increases the flexibility of the basket configuration and geometry. The insert molding of a basket, rather than just an arch, onto any terminal and thermistor orientation is possible with this concept.

Referring to FIG. 5, this sensor has three parts: the thermistor 28, the terminals 30 of thermistor assembly 22, and the insert molded plastic body 32. Since there are no subdivisions, within the three divisions, this is a lowest cost and most reliable design. Although originally designed for an inside the passenger compartment sensor application (HVAC), the design could be implemented on any application that permits or requires an open tip (i.e., engine intake air application, transmission temperature sensor application). Because of the flexibility in the design of the basket (or even a solid tube or cylinder with threads or other mating features), this design has the potential to replace designs that required multiple operations or pieces.

In applications where leaking of air through the sensor may be a concern, this design minimizes that potential. Although insert molding does not provide a leak proof seal, it does prevent large volumes of air from leaking and also eliminates the potential of this leaking air whistling or hissing.

The temperature sensor may be a threaded temperature sensor since this design enables molding a solid cross-section where the torsional stress is the highest, while maintaining a open tip in a protective basket. Other sensing elements that cannot be overmolded with plastic, because it may hinder the performance or the element may become permanently damage, may also use this technology.

What is claimed is:

1. An insert molded open air thermal probe with a protective basket comprising:

a thermistor and terminals connected to the thermistor, the thermistor having two opposite flat faces and two narrower sides;

a single piece plastic overmold covering a portion of the terminals leaving a portion of the terminals exposed, the terminals each having a male prong portion having a length and perimeter around a cross-section of the length, said plastic overmold having a basket surrounding the thermistor, said basket having at least a first set of four side windows defined therein, said first set of side windows being at least at ninety degree angles to each other in a radial direction, a first side window being positioned to provide unobstructed air flow perpendicular to at least one whole side of the thermistor, and a second and third side window each positioned to provide unobstructed air flow across a face of the thermistor, and the single piece plastic overmold having a closed end opposite the basket and completely enclosing and embedding the perimeter of the male prong along a portion of the length of the male prong.

2. An insert molded open air thermal probe with a protective basket as set forth in claim 1 further including a top window facing each of the four side windows at a ninety degree angle.

3. An insert molded open air thermal probe with a protective basket comprising:

a thermistor and terminals connected to the thermistor, the thermistor having two opposite flat faces and two narrower sides;

a single piece plastic overmold covering a portion of the terminals leaving a portion of the terminals exposed, the terminals each having a male prong portion having a male prong portion having a length and perimeter around a cross-section of the length, the plastic overmold having a basket surrounding the thermistor, the basket having at least a first set of four side windows defined therein, said first set of side windows at least at ninety degree angles to each other in a radial direction, said basket being constructed and arranged to provide at least one side window allowing air to flow perpendicularly across at least one whole side of the thermistor for enhanced response time of the thermistor, and wherein each of the four side windows is defined in part by two spaced apart parallel elongated side legs and a bottom leg running perpendicularly to the side legs, and wherein said side windows further comprise a top leg running perpendicularly to the side legs, and further comprising a top window facing the side windows at a ninety degree angle and defined by the top legs of each of the side windows, and the single piece plastic overmold having a closed end opposite the basket and completely enclosing and embedding the perimeter of the male prong along portion of the length of the male prong.

* * * * *